United States Patent Office 3,541,054
Patented Nov. 17, 1970

---

3,541,054
POLYMERS CONTAINING QUINAZOLONE RINGS
Tohru Takekoshi, Schenectady, N.Y., assignor to General Electric Company, a corporation of New York
No Drawing. Filed Aug. 5, 1968, Ser. No. 749,974
Int. Cl. C08g 20/20
U.S. Cl. 260—78                                   7 Claims

ABSTRACT OF THE DISCLOSURE

Linear polymers containing amide linkages are prepared by the reaction of diaminodiamido aryl organic compounds with difunctional acid halides and quinazoline-4-one ring systems are produced by the thermal cyclocondensation of the linear polyamides. These compositions are useful as protective films for metals, as electrical insulation, and as the dielectric film for capacitors, etc.

---

This invention relates to polymers and co-polymers containing quinazoline-4-one ring systems, and to a process for producing the same.

In accordance with the process of this invention a diamidodiamino aryl organic compound of the formula I 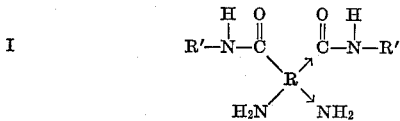

wherein the arrows denote isomerism, R is an aromatic tetravalent organic radical as defined below, and R' is hydrogen or a monovalent hydrocarbon radical containing up to and including twelve carbon atoms, is mixed with a diacid halide of the formula, II 

wherein R'' is a divalent aromatic organic radical containing up to eighteen carbon atoms and X is halogen, for example, fluorine, chlorine, bromine, or iodine and the mixture maintained at a temperature at which the diamidodiamino aryl organic compound of Formula I and the diacid halide of Formula II react to produce a linear polyamide containing units of the formula, III 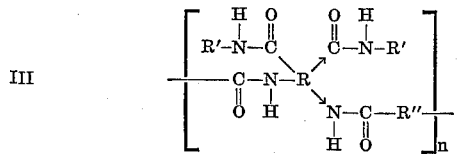

wherein R, R' and R'' have the above defined meanings and n is an integer of at least ten, for example, from ten to ten thousand.

The polymer of Formula III is then heated to temperatures of from 300° C. and 450° C. to produce polyquinazolone polymers containing units of the formula, IV 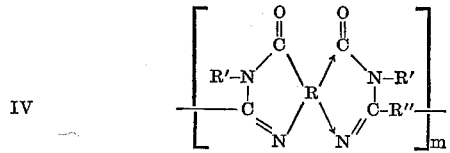

wherein R, R' and R'' have the above defined meanings and m is an integer of at least ten, for example, from ten to ten thousand or more.

It should be understood that in the above formulas R, R', and R'' need not necessarily represent the same entity throughout the molecule, thus, for example, it is possible to employ two or more diamidodiamino aryl organic compounds of Formula I with two or more diacid halides of Formula II to produce copolymeric compositions containing the quinazolone ring in the polymer.

It should also be understood that it is not necessary that the polymeric component of Formula IV be composed entirely of the quinazolone rings as illustrated. This is particularly true since conversion of the composition of Formula III to that of Formula IV is not instantaneous and the amount of the quinazolone ring system present will vary with the time and temperature of heating.

It is also contemplated that in the process of this invention aromatic diamines having the formula, (V) 

wherein R''' is a divalent aromatic organic radical containing up to eighteen carbon atoms can be substituted for part, e.g. from 1.0 to 90 mole percent and preferably from 1 to 60 mole percent of the diamidodiamino aryl organic compound of Formula I to produce polyamide copolymers having the formula VI 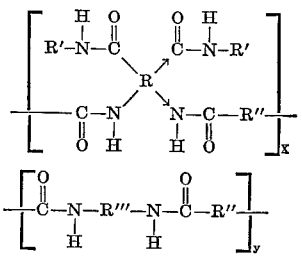

wherein R, R', R'', and R''' are as above defined and x and y are intergers of at least one and can be, for example, from ten to ten thousand or higher. The copolymers of Formula VI then can be heated to temperatures of from 300° C. to 450° C. so as to cyclo-condense the polyamide to form a ring to produce copolymers containing the quinazolone ring structure which copolymers have the following formula VII 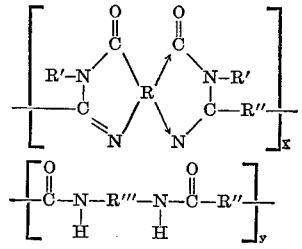

wherein R, R', R'', R''', x and y have the above defined meanings. It should be understood that complete cyclic condensation of all of the units into the quinazolone structure is not necessary, but can vary in amounts depending upon the time and the temperature of the heating step. Thus, the homopolymeric and copolymeric quinazolone ring containing compositions produced by the process of this invention are generically represented by the following formula VIII 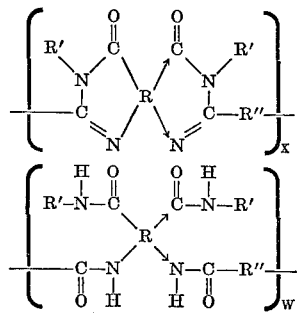

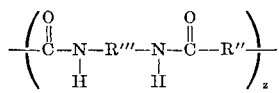

wherein R, R', R", R''' and x are as above defined and w and z are intergers of 0 or more, for example 0 to 10,000 or more, the sum of $x+w+z$ being at least 10.

In conducting the reaction of the diamidodiamino organic compound of Formula I with the diacid halide compound of Formula II in accordance with the process of this invention, the ratio of the reactants is not narrowly critical and can vary over wide ranges. The degree of polymerization of the compounds can be controlled by varying the ratio of the reactants. The highest degree of polymerization is obtained when the reactants are employed in equal molar ratios. It is therefore preferred in conducting the process of this invention to employ the reactants in approximately equal molar ratios, for example, a total of from 1.03 to 1.0 moles of the diamidodiamino organic compound of Formula I and the diamine of Formula V to from 1 to 1.03 moles of the diacid halide of Formula II. The use of either reactant in large excess limits the extent of the polymerization. Besides using an excess of one reactant to limit the molecular weight of the polymer produced, a chain terminating agent such as an organic monoacid halide such as benzoyl chloride, acetyl chloride, etc., or an organic monoamino compound such as benzyl amine, methyl amine, etc., can also be used to "cap" the ends of the polymer chain.

The temperature at which the diamidodiamino organic compound of Formula I is reacted with the diacid halide of Formula II is not narrowly critical and can range, for example, from as low as −20° to as high as 150° C. Temperatures above 150° C. can be employed; however, these temperatures may lead to cyclic-condensation of the resultant polyamide product. It is therefore preferred to conduct the reaction step of this process at temperatures below 150° C.

Although a solvent is not necessary in conducting the process of this invention, a solvent is desirable in the process of producing the polyamides for ease of handling and ease of the control of the reaction temperature. It is preferred to employ those organic solvents which do not react with the reactants and in which at least one of the reactants and preferably both of the reactants and the reaction product are soluble. The amount of the organic solvent employed is not narrowly critical and need only be sufficient to dissolve one of the reactants. Thus, for example, one can employ from ten to one thousand or more parts by weight of the solvent for each one hundred parts by weight of the total reactants. Among the solvents which can be employed in the process of this invention are included N-methylpyrrolidone, and the normally liquid N,N-dialkylcarboxylamides, for example, N,N-dimethylformamide, N,N-dimethylacetamide, etc., N-methylcaprolactan, N-methyl-2-pyrrolidone, N-ethyl-2-pyrrolidone, dimethylsulfoxide, tetramethylurea, pyridine, dimethylsulfone, tetramethylenesulfone, formamide, N-methylformamide, and hexamethylphosphoramide. These more active solvents can also be used in combination with poor solvents such as dioxane, butyrolactone, benzonitrile, benzene, toluene, xylene, and cyclohexane.

The cyclocondensation step of this invention is conducted in the absence of any solvent in order to be able to heat the polyamides of Formula III to temperatures of from 250° C. to 500° C. where the cyclocondensation reaction is effected.

In conducting the cyclocondensation step of this invention one can employ temperatures of from 250° C. to 500° C. It is preferred to employ temperatures of from 300° C. to about 450° C. in order to effect the cyclocondensation at a reasonable rate and to prevent thermal decomposition of the product.

The polyamide polymers and copolymers of Formula III and Formula VI produced in accordance with the process of this invention can be deposited as films from solutions of the organic solvents. These compositions can be applied to a variety of substrates, for example, to metals such as copper, brass, aluminum and steel as insulating or protective films for such materials. These films are particularly useful as electrical insulation on copper wires, in capacitor devices, etc. The polyamide polymeric and copolymeric films can be heated to cause cyclocondensation to polymers and copolymers having the Formula VIII. These cyclocondensed compositions are are also useful as electrical insulation on copper wires, as a dielectric material in capacitor devices, etc.

The monovalent hydrocarbon radicals which R' represents include alkyl radicals, such as methyl, ethyl, isopropyl, propyl, t-butyl, dodecyl, etc., alkenyl radicals, such as, crotyl, allyl, methallyl, decenyl, etc., cycloalkyl and cycloalkenyl, such as cyclopentyl, cyclohexyl, cyclopentenyl, cyclohexenyl, etc., aryl radicals, such as, phenyl, naphthyl, xenyl, etc., aralkyl radicals, such as, benzyl, beta-phenylethyl, beta-phenylpropyl, etc., alkaryl radicals, such as tolyl, xylyl, etc.

The aromatic tetravalent organic radicals represented by R are, for example,

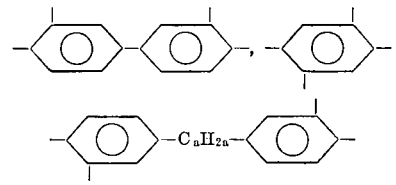

wherein $a$ has a value of from 1 to 3,

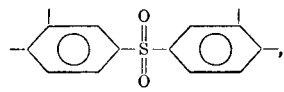

and

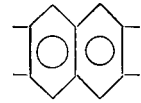

The following species of diaminodiamido aryl organic compounds are suitable for practicing the invention: benzidine-3,3'-biscarboanilide, benzidine-3,3'-bis (N-tolylcarboamide), 3,3' - diaminobiphenyl-4,4'-biscarboanilide, 1,3-phenylenediamine-4,6-biscarboanilide, 1,4-phenylenediamine-2,5-biscarboanilide. The diaminodiamido aryl organic compounds of Formula I are prepared as follows. The corresponding diamino-dicarboxy compounds are treated with boiling thionyl chloride to yield di(thionylamino)di(chloroformyl) compounds. The latter compounds are reacted with ammonia or primary amines such as methyl amine, butyl amine, dodecylamine, aniline, benzyl amine, toluidine, 2,3-dimethylaniline, etc., and the resultant product then treated with water to cause hydrolysis and form the diaminodiamido aryl organic compound.

The aromatic divalent hydrocarbon radicals represented by R" and R''' are, for example, phenylene, biphenylene, naphthylene, and,

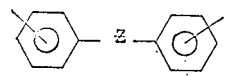

where Z is

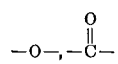

and $C_aH_{2a}$ where $a$ is as above defined. The following species of diamines are typical of suitable diamine reactants for practicing the invention: 4,4'-diamino-diphenyl methane, 4,4'-diaminodiphenyl propane, meta-phenylene diamine, para-phenylene diamine, benzidine, m-xylylene diamine, p-xylylene diamine, 2,6-diaminopyridine, 1,5- diaminonaphthalene, 3,3'-dimethyl-4,4'-diamino-biphenyl.

The following species of organic diacid halides are suitable for practicing the invention: isophthaloyl chloride, terephthaloyl bromide, benzophenone-4,4'-biscarbonyl chloride, and the acid halide of the various isomeric naphthalene dicarboxylic acids, e.g.

1,2-naphthalene dicarboxylic acid, dichloride
1,4-naphthalene dicarboxylic acid, dibromide
1,5-naphthalene dicarboxylic acid, dichloride
1,6-naphthalene dicarboxylic acid, dichloride
1,7-naphthalene dicarboxylic acid, dichloride
2,3-naphthalene dicarboxylic acid, dichloride
2,6-naphthalene dicarboxylic acid, dibromide
2,7-naphthalene dicarboxylic acid, dibromide and the like.

The following examples serve to further illustrate this invention. All parts are parts by weight unless otherwise expressly set forth.

EXAMPLE 1

Benzedine-3,3'-biscarboanilide (4.225 parts) was dissolved in anhydrous N-methyl-pyrrolidone (34 parts) and the solution was stirred below 0° C. Isophthaloyl chloride (2.030 parts) was added in increments to the solution over a period of about five minutes. The reaction mixture instantly became viscous. The last trace of the diacid chloride was washed in with 20 parts of N-methyl-pyrrolidone and the polymer was precipitated by the addition of the solution in 1600 parts of methanol. The polymer was washed with acetone and dried. The yield of the polymer having the following formula

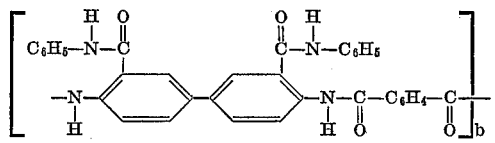

where $b$ is an integer of at least 10, was 99.7% and the intrinsic viscosity of the polymer in N-methylpyrrolidone at 25° C. was 0.85 dl./g. A film of this polyamide was prepared by casting from the N-methylpyrrolidone solution. This film was very flexible and clear.

The film was then heated at 300° C. under vacuum for two hours to partially convert some of the amide groups to the cyclic quinazolone structure. The cyclocondensation of the amide polymer was completed by heating one hour at 350° C. to 360° C. to yield a polymer film which was flexible and considerably stiffer than that produced which contained only the amide structure. The film was a polymer consisting of repeating units of the formula

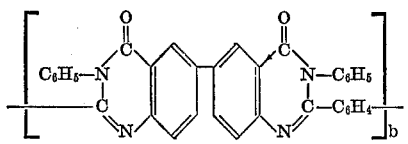

where $b$ is an integer of at least 10.

EXAMPLE 2

A copolymer containing the quinazolone rings can be produced by substituting an equivalent amount of para-phenylenediamine for the benzidinecarboanilide in Example 1 and employing the same amount of the isophthalyl chloride.

The copolymer which is produced has the formula

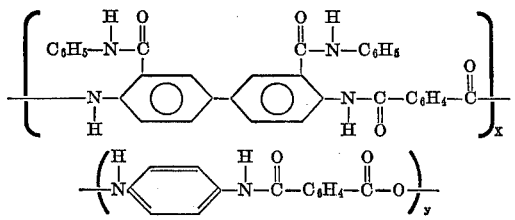

wherein $x$ is an integer of at least 1 and $y$ is an integer of at least 1.

By heating this amide copolymer to temperatures of 300–400°, as in Example 1, some of the amide groups can be converted to the cyclic quinazolone structure having the formula

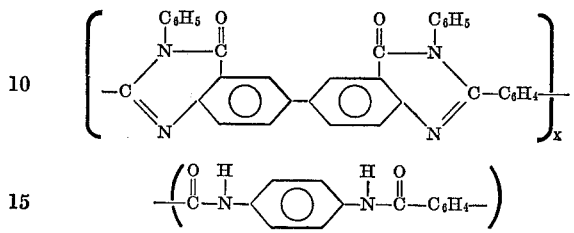

where $x$ and $y$ are integers of at least 1 and whose sum is at least 10.

It will, of course, be apparent to those skilled in the art that other reactants within the scope of those shown in the generic formulas can be substituted for the particular reactants shown in the above examples to give a wide range of polymeric and copolymeric compositions without departing from the scope of this invention.

What is claimed is:

1. A process for producing linear polyamide compositions selected from the class consisting of polyamides of the formula

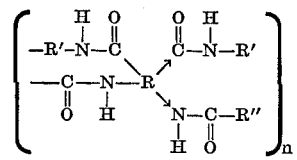

and copolymeric polyamides having the formula

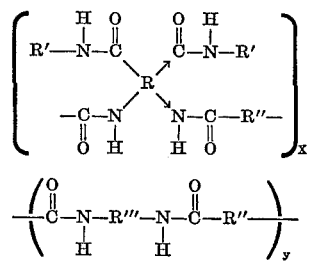

wherein R is an aromatic tetravalent organic radical selected from the group consisting of

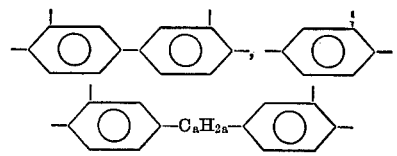

wherein $a$ has a value of from 1 to 3,

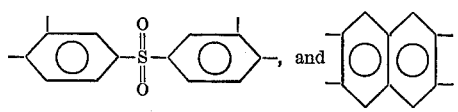

R' is hydrogen or a monovalent hydrocarbon radical containing up to 12 carbon atoms, R'' and R''' are divalent aromatic organic radicals containing up to 18 carbon atoms, $n$ is an integer of at least 10 and $x$ and $y$ are integers of at least 1, which comprises forming an admixture of (1) a diacid halide of the formula

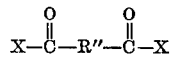

wherein R" has the above-defined meanings and X is halogen, (2) a diamidodiamino aryl organic compound having the formula

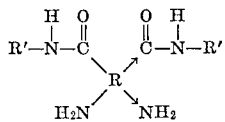

wherein R and R' are as above-defined, and from 0 to 90 mole percent of (2) being substituted with a diamino compound having the formula

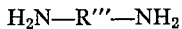

wherein R''' has the above-defined meaning, and maintaining said admixture at a temperature below about 300° C., to produce said linear polyamides.

2. A process as claimed in claim 1, wherein the process is conducted in the presence of a solvent.

3. A linear film forming polyamide composition selected from the class consisting of polyamides of the formula

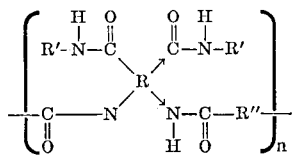

and copolymeric polyamides having chemically combined units of the formula

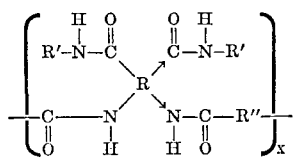

and

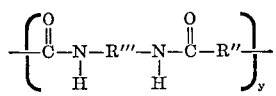

wherein R is an aromatic tetravalent organic radical, R' is hydrogen or a monovalent hydrocarbon radical containing up to 12 carbon atoms, R" and R''' are divalent aromatic organic radicals containing up to 18 carbon atoms, $n$ is an integer of at least 10, and $x$ and $y$ are integers of at least 1.

4. A composition as in claim 3 having the formula

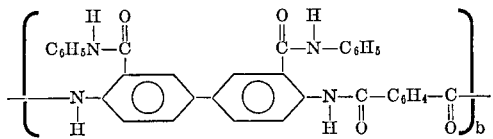

wherein $b$ is an integer of at least 10.

5. A process as in claim 1 wherein the reaction product is heated to a temperature of from 300–450° C. to cause cyclocondensation to produce a polymer containing quinazolone rings said polymers having the formula

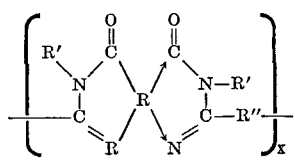

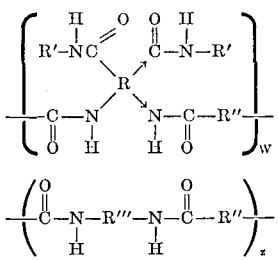

wherein R is an aromatic tetravalent organic radical, R' is a monovalent hydrocarbon radical containing up to 12 carbon atoms, R" and R''' are divalent aromatic organic radicals containing up to 18 carbon atoms, $x$ is an integer having a value of at least 1 and $w$ and $z$ are integers of at least 0.

6. A polymer containing a film forming quinazolone ring said polymer having the formula

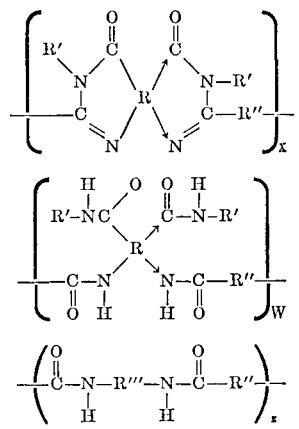

wherein R is an aromatic tetravalent organic radical, R' is a monovalent hydrocarbon radical containing up to 12 carbon atoms, R" and R''' are divalent aromatic organic radicals containing up to 18 carbon atoms, x is an integer of at least 1, and w and z are integers of at least 0.

7. A composition as in claim 6 having the formula

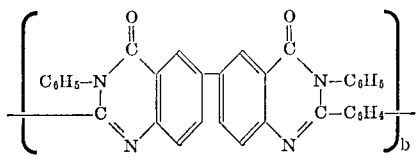

wherein $b$ is an integer of at least 10.

References Cited

UNITED STATES PATENTS

| | | | |
|---|---|---|---|
| 3,049,518 | 8/1962 | Stephens | 260—78 |
| 3,232,910 | 2/1966 | Preston | 260—78 |
| 3,240,760 | 3/1966 | Preston et al. | 260—78 |
| 3,408,326 | 10/1968 | Errede | 260—47 |
| 3,444,136 | 5/1969 | Belohlav et al. | 260—47 |

WILLIAM SHORT, Primary Examiner

H. SCHAIN, Assistant Examiner

U.S. Cl. X.R.

117—128.4, 132, 161; 260—30.2, 30.4, 30.6, 30.8, 32.4, 326, 47